US008549499B1

(12) United States Patent
Ding et al.

(10) Patent No.: US 8,549,499 B1
(45) Date of Patent: Oct. 1, 2013

(54) PARALLEL PROGRAMMING USING POSSIBLE PARALLEL REGIONS AND ITS LANGUAGE PROFILING COMPILER, RUN-TIME SYSTEM AND DEBUGGING SUPPORT

(75) Inventors: Chen Ding, Rochester, NY (US); Xipeng Shen, Williamsburg, VA (US); Ruke Huang, Edmonds, WA (US)

(73) Assignee: University of Rochester, Rochester, NY (US)

( * ) Notice: Subject to any disclaimer, the term of this patent is extended or adjusted under 35 U.S.C. 154(b) by 1488 days.

(21) Appl. No.: 11/812,368

(22) Filed: Jun. 18, 2007

Related U.S. Application Data

(60) Provisional application No. 60/814,065, filed on Jun. 16, 2006.

(51) Int. Cl.
*G06F 9/44* (2006.01)
*G06F 9/45* (2006.01)
*G06F 9/30* (2006.01)
*G06F 9/38* (2006.01)

(52) U.S. Cl.
USPC ........... 717/149; 717/119; 717/127; 717/150; 712/216; 712/229

(58) Field of Classification Search
None
See application file for complete search history.

(56) References Cited

U.S. PATENT DOCUMENTS

| 5,230,053 | A | * | 7/1993 | Zaiki | 717/150 |
| 5,812,852 | A | * | 9/1998 | Poulsen et al. | 717/149 |
| 6,801,997 | B2 | * | 10/2004 | Joy et al. | 712/229 |
| 7,082,601 | B2 | * | 7/2006 | Ohsawa et al. | 717/149 |
| 7,712,080 | B2 | * | 5/2010 | Pan et al. | 717/119 |
| 7,882,498 | B2 | * | 2/2011 | Ottoni et al. | 717/149 |
| 2002/0129339 | A1 | * | 9/2002 | Callahan et al. | 717/127 |
| 2003/0028755 | A1 | * | 2/2003 | Ohsawa et al. | 712/216 |
| 2004/0172626 | A1 | * | 9/2004 | Jalan et al. | 717/149 |
| 2005/0144602 | A1 | * | 6/2005 | Ngai et al. | 717/151 |
| 2006/0005176 | A1 | * | 1/2006 | Kawahara et al. | 717/149 |

OTHER PUBLICATIONS

Chen, T., et al., Data Dependence Profiling for Speculative Optimizations, Springer-Verlag Berlin Heidelberg, 2004, pp. 57-72, [retrieved on Apr. 6, 2012], Retrieved from the Internet: <URL:http://www.springerlink.com/index/tx352qfnn835yh4a.pdf>.*

(Continued)

*Primary Examiner* — Thuy Dao
*Assistant Examiner* — Geoffrey St Leger
(74) *Attorney, Agent, or Firm* — Harris Beach PLLC

(57) ABSTRACT

A method of dynamic parallelization for programs in systems having at least two processors includes examining computer code of a program to be performed by the system, determining a largest possible parallel region in the computer code, classifying data to be used by the program based on a usage pattern and initiating multiple, concurrent processes to perform the program. The multiple, concurrent processes ensure a baseline performance that is at least as efficient as a sequential performance of the computer code.

24 Claims, 2 Drawing Sheets

(56) References Cited

OTHER PUBLICATIONS

Ding, C., et al., Gated Memory Control for Memory Monitoring, Leak Detection and Garbage Collection, Proceedings of the 2005 workshop on Memory system performance, ACM, 2005, pp. 62-67, [retrieved on Apr. 2, 2012], Retrieved from the Internet: <URL:http://dl.acm.org/>.*

Shen, X., et al., Parallelization of Utility Programs Based on Behavior Phase Analysis, LCPC'05 Proceedings of the 18th international conference on Languages and Compilers for Parallel Computing, 2005, pp. 425-432, [retrieved on Aug. 19, 2011], Retrieved from the Internet: <URL:https://urresearch.rochester.edu/home.action>.*

Packirisamy, V., et al., OpenMP in Multicore Architectures, 2005, 15 pages, [retrieved on Apr. 3, 2012], Retrieved from the Internet: <URL:http://www-users.cs.umn.edu/~harish/reports/openMP.pdf>.*

\* cited by examiner

PARALLEL PROGRAMMING USING POSSIBLE PARALLEL REGIONS AND ITS LANGUAGE PROFILING COMPILER, RUN-TIME SYSTEM AND DEBUGGING SUPPORT

CROSS-REFERENCE TO RELATED APPLICATIONS

The present application claims the benefit of U.S. Provisional Patent Application No. 60/814,065, filed Jun. 16, 2006, whose disclosure is hereby incorporated by reference in its entirety into the present disclosure.

STATEMENT OF GOVERNMENT INTEREST

The work leading to the present invention was supported by NSF Contract Nos. CNS-0509270 and CCR-0238176. The government has certain rights in the invention.

FIELD OF THE INVENTION

The present invention is directed to techniques for increased efficiency in programming, and more particularly methods and systems that allow for parallelization based on program behavior.

DESCRIPTION OF RELATED ART

Many existing programs have dynamic parallelism at the high level, such as, a compression tool that processes data buffer by buffer, an English parser parsing sentence by sentence, and an interpreter interpreting expression by expression. They are complex and may make extensive uses of bit-level operations, unrestricted pointers, exception handling, custom memory management, and third-party libraries. The unknown data access and control flow make them difficult if not impossible for automatic techniques. Moreover, many programs have input-dependent behavior where both the degree and the granularity of parallelism are not guaranteed or even predictable. For manual parallelization, the complexity and the uncertain performance gain do little to warrant the investment of time and the risk of error.

Thus, there is a need for a software productivity tool which converts conventional code to run-time code for multi-processor computers. It should enable the conversion of large bodies of existing code written for conventional single-processor computers to parallelized code which can take advantage of the new multi-processor computers to achieve performance enhancements of several-fold.

Additionally, there is a need for automated parallelization methods and systems that can increase efficiency and can provide greater predictability. These parallelization techniques should allow for improved performance and should be applicable to existing code. The processes would need to be simple to implement and can be implemented in incremental steps to ensure performance benefits.

SUMMARY OF THE INVENTION

Many sequential applications are difficult to parallelize because of problems such as unpredictable data access, input-dependent parallelism, and custom memory management. These difficulties have led to the system of the present invention for behavior-oriented parallelization (BOP), which allows a program to be parallelized based on partial information about program behavior, for example, a user reading just part of the source code, or a profiling tool examining merely one or few inputs.

The basis of BOP is programmable software speculation, where a user or an analysis tool marks possibly parallel regions in the code, and the run-time system executes these regions speculatively. The present invention allows for the entire address space to be protected during speculation. The present invention demonstrates that the general protection can be made cost effective by three novel techniques: programmable speculation, critical-path minimization, and value-based correctness checking. On a multi-core, multi-processor PC, the BOP system improves the whole-program performance by integer factors for a Lisp interpreter, a data compressor, a language parser, and a scientific library.

To achieve the above and other objects, the present invention is directed to a method of dynamic parallelization for programs in systems having at least two processors includes examining computer code of a program to be performed by the system, determining a largest possible parallel region in the computer code, classifying data to be used by the program based on a usage pattern and initiating multiple, concurrent processes to perform the program. The multiple, concurrent processes ensure a baseline performance that is at least as efficient as a sequential performance of the computer code.

In addition, the initiation of the multiple concurrent processes may include initiating at least a lead process, an understudy process and one or more speculation processes. The step of classifying data may include classifying data as either shared data, checked data or private data. The method may improve performance of the computer code by integer factors when compared to the sequential performance of the computer code. Also, the computer code may have been written to be run on systems having a single processor. The examining, determining and classifying steps may be performed through examination of a portion of the total computer code. Additionally, the method may be performed in a step-by-step fashion to allow a programmer to discover hidden dependencies in the multiple, concurrent processes.

According to at least one embodiment, the invention is directed to a computer program product, embodied on a computer-readable medium, having instructions to perform the steps of examining computer code of a program to be performed by a system having at least two processors, determining a largest possible parallel region in the computer code, classifying data to be used by the program based on a usage pattern and initiating multiple, concurrent processes to perform the program. The multiple, concurrent processes ensure a baseline performance that is at least as efficient as a sequential performance of the computer code.

According to at least another embodiment, the invention is directed to a compiling system for enabling dynamic parallelization for programs in computing systems having at least two processors including means for examining computer code of a program to be performed by a computing system having at least two processors, means for determining a largest possible parallel region in the computer code, means for classifying data to be used by the program based on a usage pattern and means for initiating multiple, concurrent processes to perform the program. The multiple, concurrent processes ensure a baseline performance that is at least as efficient as a sequential performance of the computer code.

BRIEF DESCRIPTION OF THE DRAWINGS

A preferred embodiment of the present invention will be set forth in detail with reference to the drawings, in which.

DETAILED DESCRIPTION OF THE INVENTION

Figure 1:
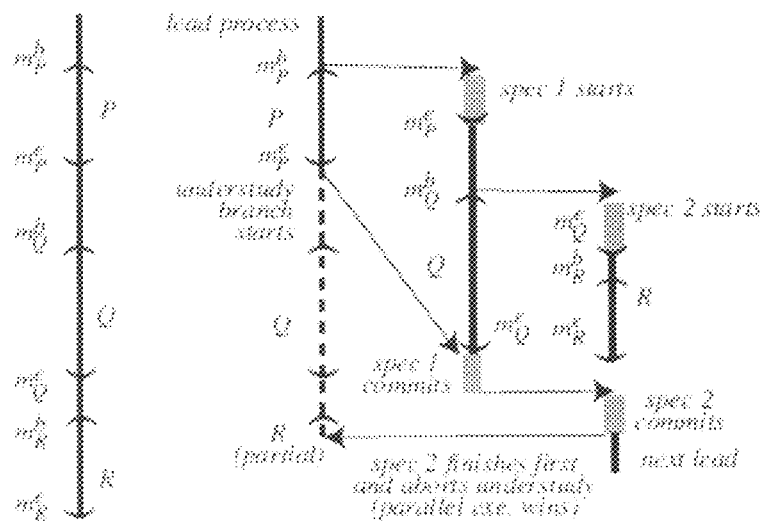
FIG. 1 is an illustration of the sequential and the speculative execution of three possibly parallel region (PPR) instances, according to at least one embodiment of the present invention.

The present invention will be set forth in detail with reference to the drawings, in which like reference numerals refer to like elements or operational steps throughout.

While other methods exist to parallelize code, these have typically been complex and may depend on bit-level operations, unrestricted pointers, exception handling, custom memory management and third party libraries. The BOP (Behavior-Oriented Parallelization) tool of the present invention may not be as efficient as thread-level techniques, but it has a significant advantage in ease of programming. It can parallelize a program based on only partial information, requires little or no manual changes to the sequential program and no debugging. This behavior-oriented tool allows a program to be parallelized based on partial information about program behavior from, for example, a user reading just part of the source code, or a profiling tool examining just a few inputs. The parallelization is done on that part of the execution which has coarse-grained parallelism, while guaranteeing correctness and basic efficiency for the rest of the execution.

The present invention addresses the above-described problems with behavior-oriented parallelization (BOP), which parallelizes the part of an execution if it has coarse-grain parallelism, while guaranteeing correctness and basic efficiency for the rest of the execution. Behavior analysis, which finds frequent, input-dependent behavior, differs from program analysis, which finds invariance in all behavior. Although behavior analysis yields only partial information, it is useful for incrementally parallelizing a program or streamlining it for common uses.

BOP lets a user or a profiling tool to suggest possibly parallel regions (PPR) in a program by marking the start and the end of the region with matching markers: BeginPPR(p) and EndPPR(p). TABLE 1 shows the marking of possible (pipelined) loop parallelism and possible function parallelism respectively. PPR is region-based (which is different from communication-based do-across; see, for example, R. Allen and K. Kennedy, *Optimizing Compilers for Modern Architectures: A Dependence-based Approach*, Morgan Kaufmann Publishers, October 2001), the parallelism is likely but not definite (which is different from future and parallel section constructs; see, for example, R. H. Halstead, Multilisp: a language for concurrent symbolic computation, *ACM Transactions on Programming Languages and Systems*, (*TOPLAS*), 7(4):501-538, 1985.), and a region may be well formed (which is different from transactions; see, for example, M. Herlihy and J. E. Moss, Transactional memory: Architectural support for lock-free data structures, *Proceedings of ISCA*, San Diego, Calif., May 1993.).

TABLE 1

| possible loop parallelism | possible function parallelism |
| --- | --- |
| while (1) { | ... |
| get work( ); | BeginPPR(1); |
| ... | work(x); |
| BeginPPR(1); | EndPPR(1); |
| step1( ); | ... |
| step2( ); | BeginPPR(2); |
| EndPPR(1); | work(y); |
| ... | EndPPR(2); |
| } | ... |

To support possible parallelism, BOP protects the entire address space by dividing it into possibly shared and privatizable subsets and monitoring and replicating them accordingly. The virtual memory protection mechanism in modern operating systems can be readily used for this purpose. For BOP, the VM protection effects on-demand data replication and supports complete rollback.

The process-based protection has a high overhead. However, much of it is inherently unavoidable for a software scheme to support unpredictable computations. The present invention demonstrates that general protection can be made cost effective by three techniques. The first is programmable speculation. Since the overhead depends on the size of (write) accessed data rather then the length of the PPR region, it can be made negligible if the size of the parallel task is large enough.

Second, most overheads—starting, checking, and committing—are off the critical path, so the non-speculative execution is almost as fast as the unmodified sequential execution. Moreover, a tournament is held in every parallel run, where the correct speculative result is used only when the speculation finishes faster than the would-be sequential execution.

Last, the BOP system uses value-based checking, which is more general than dependence-based checking (also known as Bernstein conditions). It permits parallel execution in the presence of true dependences and it is one of the main differences between process based BOP and existing thread-based systems, as discussed below. The present application also presents a formal proof of its correctness in software speculation and show how BOP bounds and hides its run-time costs.

BOP may not be as efficient as thread-level techniques because of the overhead of general protection and the problem of false sharing. Speculation also causes unnecessary computations and by nature cannot handle general forms of I/O and other operations with unrecoverable side effects (inside a PPR). However, the main advantage is ease of programming. BOP can parallelize a program based on only partial information. It requires little or no manual changes to the sequential program and no parallel programming or debugging. The overhead of the system can be hidden when there is enough parallelism. BOP uses unmodified, fully optimized sequential code while explicit threading and its compiler support are often restrained due to concerns over the weak memory consistency on modern processors. With these features, BOP addresses the scalability of a different sort—to let large, existing software benefit from parallel execution.

The PPR markers are written as BeginPPR(p) and EndPPR(p), where p is a unique identifier. At a start marker, BOP forks a process that jumps to the matching end marker and speculatively executes from there. While multiple BeginPPR(p) may exist in the code, EndPPR(p) must be unique for the same p. The matching markers can only be inserted into the same function. The exact code sequence in C language is as follows:

BeginPPR(p): if (BeginPPR(p)==1) goto EndPPR p;
EndPPR(p): EndPPR(p); EndPPR p:;

At the presence of unpredictable control flows, there is no guarantee that a start marker is followed by its end marker, or the matching markers are executed the same number of times. For example, a longjmp in the middle of a parallel region may cause the execution to back out and re-enter.

The BOP system constructs a sequence of zero or more nonoverlapping PPR instances at run time using a dynamic scope. At any point t, the next PPR instance starts from the first start marker operation BeginPPR(p) after t and then ends at the first end marker operation EndPPR(p) after the Begin-PPR(p). For example, assume the program has two PPR regions P and Q marked by $m_P^b$, $m_P^e$, $m_Q^b$ and $m_Q^e$. If the program, from the start $t_0$, executes the markers six times from $t_1$ to $t_6$ as follows:

$$\begin{array}{ccccccc} t_0 & t_1 & t_2 & t_3 & t_4 & t_5 & t_6 \\ & m_P^b & m_P^b & m_P^e & m_Q^b & m_P^e & m_Q^e \end{array} \quad (1)$$

Two dynamic PPR instances are from $t_1$ to $t_3$ and from $t_4$ to $t_6$, which will be run in parallel. The other fragments of the execution will be run sequentially, although the part from $t_3$ to $t_4$ is also speculative.

Compared to the static and hierarchical scopes used by most parallel constructs, the dynamic scope lacks the structured parallelism to model complex task graphs and data flows. While it is not a good fit for static parallelism, it is a useful solution for the extreme case of dynamic parallelism in unfamiliar code.

A coarse-grain task often executes thousands of lines of code, communicates through dynamic data structures, and has non-local control flows. Functions may be called through indirect pointers, so parallel regions may be interleaved instead of being disjoint. Some of the non-local error handling or exceptions are frequent, for example, when an interpreter encounters a syntax error. Some are rare. For example, the commonly used gzip program has error checking and abnormal exit in the compression code. Although in our experience no error has ever happened, if one cannot prove the absence of error in gzip (or other sizeable software), dynamic scopes such as PPR can be used to parallelize the common cases while guarding against unpredictable or unknown entries and exits.

Since the PPR markers can be inserted anywhere in a program and executed in any order at run-time, the system tolerates incorrect marking of parallelism, which can easily happen when the region is marked by a profiling tool based on a few inputs or given by a user unfamiliar with the code. The markers are programmable hints, so are other parts of the interface, where the quality of hints affects the parallelism but not the correctness nor the worst-case performance.

The BOP system uses concurrent executions to hide the speculation overhead off the critical path, which determines the worst-case performance where all speculation fails and the program runs sequentially.

The execution starts as the lead process, which continues to execute the program non-speculatively until the program exits. At a (prespecified) speculation depth k, up to k processes are used to execute the next k PPR instances. For a machine with p available processors, the speculation depth is set to k-1 to make the full use of the CPU resource.

FIG. 1 illustrates the run-time setup by the example sequential and the speculative execution of three PPR instances. As shown in FIG. 1(b), when the lead process reaches the startmarker $m_P^b$, it forks the first spec process and continues to execute the PPR instance P. The spec 1 jumps to the end marker of P and executes the next PPR instance Q. At $m_Q^b$, it forks the second spec process, which jumps ahead to execute the third PPR instance R.

At the end of P, the lead process becomes the understudy process, which re-executes the next PPR instance non-speculatively. In addition, it starts a parallel branch (a process in our current implementation) to check the correctness of spec 1. If no conflict is detected, the checking branch commits with spec 1, and the two are combined into a single process. More speculation processes are handled recursively in a sequence. The kth spec is checked and combined after the first k−1 spec processes commit. When multiple spec processes are used, the data copying is delayed until the last commit. The changed data is copied only once instead of multiple times in a rolling commit.

The speculation runs slower than the normal execution because of the startup, checking, and commit costs. The costs may be much higher in process-based systems than in thread-based systems. In the example in FIG. 1(b), the startup and commit costs, shown as gray bars, are so high that the parallel execution of spec 1 finishes slower than the sequential understudy. However, by that time spec 2 has finished and is ready to commit. The second commit finishes before the understudy finishes, so spec 2 aborts the understudy and becomes the next lead process.

BOP executes PPR instances in a pipeline and shares the basic property of pipelining: if there is an infinite number of PPRs, the average finish time is determined by the starting time not the length of each speculation. In other words, the parallel speed is limited only by the speed of the startup and the size of the sequential region outside PPR. The delays during and after speculation do not affect the steady-state performance. This may be counter intuitive at first because the commit time does not matter even though it is sequentially done. In the example in FIG. 1(b), spec 2 has similar high startup and commit costs but they overlap with the costs of spec 1. In experiments with real programs, if the improvement jumps after a small increase in the speculation depth, it usually indicates a high speculation overhead.

BOP assumes that the probability, the size, and the overhead of parallelism are all unpredictable. The understudy provides a safety net not only for correctness (when speculation fails) but also for performance (when speculation is too slow). For performance, BOP holds a two-team race between the non-speculative understudy and the speculative processes.

The non-speculative team represents the worst-case performance or the critical path. If all speculation fails, it sequentially executes the program. As is explained in the next part, the overhead for the lead process only consists of the page-based write monitoring for the first PPR instance. The understudy runs as the original code without any monitoring. As a result, if the granularity of PPR instance is large or when the speculation depth is high, the worst-case running time should be almost identical to that of the unmodified sequential execution. On the other hand, whenever the speculation finishes faster than the understudy, it means a performance improvement over the would-be sequential execution.

The performance benefit of understudy comes at the cost of potentially redundant computation. However, the cost is at most one re-execution for each speculatively executed PPR, regardless of the depth of the speculation.

With the understudy, the worst-case parallel running time is equal to the sequential time. One may argue that this can be easily done by running the sequential version side by side in a sequential parallel race. The difference is that the BOP system is running a relay race for every group of PPR instances. At the whole-program level it is sequential-parallel collaboration rather than competition because the winner of each relay joins together to make the fastest time. Every time counts when speculation runs faster, and no penalty when it runs slower. In addition, the parallel run shares read-only data in cache and memory, while multiple sequential runs do not. Finally, running two instances of a program is not always possible for a utility program, since the communication with the outside world often cannot be undone. In BOP, unrecoverable I/O and system calls are placed outside the parallel region.

FIG. 1 also shows the expected behavior when an execution of PPR runs from BeginPPR to EndPPR. In general, the execution may reach an exit (normal or abnormal) or an unexpected PPRmarker. TABLE 2 shows the actions for the lead process, its understudy branch, and spec processes when encountering an exit, error, or unexpected PPR markers.

TABLE 2

| behavior | prog. exit or error | Unexpected PPR markers |
|---|---|---|
| lead | exit | continue |
| understudy | exit | continue |
| spec(s) | abort speculation | continue |

The abort by spec in TABLE 2 is conservative. For example, speculation may correctly hit a normal exit, so an alternative scheme may delay the abort and salvage the work if it turns out correct. The conservative design may be favored for performance. Although it may recompute useful work, the checking and commit cost cannot delay the critical path.

The speculation process may also allocate an excessive amount of memory and attempt permanent changes through I/O and other OS or user interactions. The latter cases are solved by aborting the speculation upon file reads, system calls, and memory allocation over a threshold. The file output is buffered and is either written out or discarded at the commit point. Additional engineering can support regular file I/O. The current implementation supports stdout and stderr for the pragmatic purpose of debugging and verifying the output.

BOP uses strong isolation because the intermediate results of the lead process are not made visible to speculation processes until the lead process finishes the first PPR. Strong isolation comes naturally with process-based protection. It is a basic difference between BOP and thread-based systems, where the updates of one thread are visible to other threads. The control aspect of the difference is discussed here and the rest of comparisons are made in a later section after the data protection has been discussed.

Weak isolation allows opportunistic parallelism between two dependent threads, if the source of the dependence happens to be executed before the sink. In the BOP system, such parallelism can be made explicit and deterministic using PPR directives by placing dependent operations outside the PPR region (for example, in FIG. 1, the code outside PPR executes sequentially). At the loop level, the most common dependence comes from the update of the loop index variable. With PPR, the loop control can be easily excluded from the parallel region and the pipelined parallelism is definite instead of opportunistic.

The second difference is that strong isolation does not need synchronization during the parallel execution but weak isolation needs to synchronize between the lead and the spec processes when communicating the updates between the two. Since the synchronization delays the non-speculative execution, it adds visible overheads (when speculation fails) to the thread-based systems but not to BOP.

Although strong isolation delays data updates, it detects speculation failure and success before the speculation ends. Like systems with weak isolation, strong isolation detects conflicts as they happen because all access maps are visible to all processes for reads (each process can only update its own map during the parallel execution). After the first PPR, strong isolation can check for correctness before the next speculation finishes by stopping the speculation, checking for conflicts, and communicating data updates. As a design choice, BOP does not abort speculation early because of the property of pipelined parallelism, explained below. The speculation process, no matter how slow, may improve the program speed, when enough of them work together.

The BOP system guarantees that the same result is produced as in the sequential execution if the speculation succeeds. It partitions the address space of a running program into three disjoint groups: shared, checked, and private. More formally, $D_{all}=D_{shared}+D_{checked}+D_{private}$, and any two of $D_{shared}$, $D_{checked}$, and $D_{private}$ do not overlap.

For the following discussion two concurrent processes are considered—the lead process that executes the current PPR instance, and the spec process that executes the next PPR instance and the code in between. The cases for k (k>1) speculation processes can be proved inductively since they commit in a sequence in the BOP system.

In page-based protection of shared data, all program data are shared at BeginPPR by default and protected at page granularity. During execution, the system records all global variables and the range of dynamic memory allocation. At BeginPPR, the system turns off write permission for the lead process and read/write permission for the spec processes. It installs customized page-fault handlers that open the permission for read or write upon the first read or write access. At the same time, the handler records which page has what type of access by which process. At the commit time, each spec process is checked in an increasing order, the kth process fails if and only if a page is written by the lead process and the previous k−1 spec processes but read by spec k. If speculation succeeds, the modified pages are merged into a single address space at the commit point.

By using Unix processes for speculation, the BOP system eliminates all anti- and output dependences through the replication of the address space and detects true dependences at run-time. An example is the variable shared in TABLE 3. It may point to some large dictionary data structures. Page-based protection allows concurrent executions as long as a later PPR does not need the entries produced by a previous PPR. The overwrites by a later PPR is fine even if the entries are used concurrently by a previous PPR.

TABLE 3

Examples of shared, checked and private data shared = GetTable( );
...
while (...) {
...
BeginPPR(1)
...
if (...)
checked = checked + Search(shared, x)
Insert(private, new Node(checked))
...

TABLE 3-continued

Examples of shared, checked and private data

```
    if (!error) Reset(checked)
    ...
    EndPPR(1)
    ...
}
```

The condition is significantly weaker than the Bernstein condition (see, for example, A. J. Bernstein. Analysis of programs for parallel processing. *IEEE Transactions on Electronic Computers*, 15(5):757-763, October 1966.), which requires that no two concurrent computations access the same data if at least one of the two writes to it. The additional parallelism is due to the replication of modified data, which removes anti- and output dependences. The write access by spec k never causes failure in previous spec processes.

Page-based protection has been widely used for supporting distributed shared memory and many other purposes including race detection. While these systems enforce parallel consistency among concurrent computations, the BOP system checks for dependence violation when running a sequential program.

A common problem in page-level protection is false alerts. The problem is alleviated by allocating each global variable on its own page(s). Writes to different parts of a page may be detected by checking the difference at the end of PPR. In addition, the shared data is never mixed with checked and private data on the same page, although at run time newly allocated heap data are private at first and then converted to shared data at EndPPR.

Dependence checking is based on data access not data value. It is sufficient but not necessary for correctness. Consider the variable checked in TABLE 3, which causes true dependences as both the current and next PPR instances may read and modify it. On the other hand, the reset statement at the end may reinstall the old value as checked had at the beginning. The parallel execution is still correct despite of the true dependence violation. This case is called a silent dependence.

There is often no guarantee that the value of a variable is reset by EndPPR. In the example, the reset depends on a flag, so the "silence" is conditional. Even after a reset, the value may be modified by pointer indirection. Finally, the rest operation may assign different values at different times. Hence run-time checking is necessary.

For global variables, the size is statically known, so the BOP system allocates checked variables in a contiguous region, makes a copy of their value at the BeginPPR of the lead process, and checks their value at the EndPPR. For dynamic data, the system needs to know the range of addresses and performs the same checking steps. Checked data are found through profiling analysis or identified by a user. Since the values are checked, incorrect hints would not compromise correctness. In addition, a checked variable does not have to return to its initial value in every PPR instance. Speculation still benefits if the value remains constant for just two consecutive PPR instances.

Most silent dependences come from implicit re-initialization. Some examples are that the loop level increments and decrements when a compiler compiles a function, the traversed bits of the objects in a graph are set and reset during a depth-first search, and the work-list is filled and emptied in a scheduling pass. These variables are classified as checked data, which may take the same value at BeginPPR and End-PPR, in other words, the PPR execution may have no visible effect on the variable.

The shared data and checked data have a significant overlap, which are the data that are either read only or untouched by the parallel processes. They are classified as checked if their size is small; otherwise, they are shared. A problem is when different parts of a structure or an array require different protection schemes. Structure splitting, when possible, may alleviate the problem.

The correctness of checked data is not obvious because their intermediate values may be used to compute other values that are not checked. A formal proof of the correctness is presented below to show how the three protection schemes work together to cast a complete shield against concurrency errors.

The third group is private data, which is initialized before being used and therefore causes no conflict. In TABLE 3, if private is always initialized before it is used, the access in the current PPR cannot affect the result of the next PPR, so any true dependence cause by it can be ignored.

Private data come from three sources. The first is the program stack, which includes local variables that are either read-only in the PPR or always initialized before use. Intra-procedure dataflow analysis is adequate for most programs. When the two conditions cannot be guaranteed by compiler analysis, for example, due to unknown control flow or the address of a local variable escaping into the program heap, the local variable is redefined to be a global variable and classify it as shared data. For recursive functions, we can either use a stack of pages or disable the PPR.

The second source is global variables and arrays that are always initialized before the use in the PPR. The standard technique to detect this is inter-procedural kill analysis. In general, a compiler may not always ascertain all cases of initialization. For global data whose access is statically known in a program, the compiler automatically inserts calls after the initialization assignment or loop to classify the data as private at run time. Any access by the speculation process before the initialization causes it to be treated as shared data. For (non-aggregate) data that may be accessed by pointers, the system places it on a single page and treats it as shared until the first access. Additionally, the user is allowed to specify the list of variables that are known to be written before read in PPR. These variables are reinitialized to zero at the start of a PPR instance. Since the write-first access cannot be guaranteed in all cases, this group is called likely private data.

The third type of private date is newly allocated data in a PPR instance. Before BeginPPR, the lead process reserves regions of memory for speculation processes. Speculation would abort if it allocates more than the capacity of the region. The main process does not allocate into the region, so at EndPPR, its newly allocated data can be merged with the data from the speculation process. For programs that use garbage collection, the heap region of spec processes is encapsulated, which is described below in the test of a lisp interpreter. Another solution is to ignore GC, which, if happens during a PPR instance, will cause speculation to fail because of the many changes it makes to the shared data.

TABLE 4

| type | shared data $D_{shared}$ | checked data $D_{checked}$ | (likely) private data $D_{private}$ |
|---|---|---|---|
| protection | Not written by lead and read | Value at BeginPRR is the same at | No read before $1^{st}$ write in spec. |

TABLE 4-continued

| type | shared data $D_{shared}$ | checked data $D_{checked}$ | (likely) private data $D_{private}$ |
|---|---|---|---|
| | by spec | EndPRR in lead. Concurrent read/write allowed. | Concurrent read/write allowed. |
| granularity needed | page/element | element | element |
| support | compiler, profiler, run-time | compiler, profiler, run-time | compiler (run-time) |
| overhead on critical path | 1 fault per mod. page copy-on-write | copy-on-write | copy-on-write |

The three data protection schemes are summarized and compared in TABLE 4. Their overheads are now discussed. Most speculation costs—the forking of speculation processes, the change of protection, data replication and read and write monitoring, the checking of access maps for conflicts, the merging of modified pages, and the competition between the understudy and the spec processes—are off the critical path. Therefore, the relation between the worst-case running time $T_{parallel}^{max}$ and the time of unmodified sequential program $T_{seq}$ is:

$$T_{parallel}^{max} = T_{seq} + c_1*(S_{shared}/S_{page}) + C_2 \\ (S_{modified\ by\ 1st\ ppr} + S_{checked}) \quad (2)$$

The two terms after $T_{seq}$ are the cost from data monitoring and copying on the critical path, as explained next.

For monitoring, at the start of PPR, the lead process needs to set and reset the write protection and the access map for shared data before and after the first PPR instance. The number of pages is the size of shared data $S_{shared}$ divided by the page size $S_{page}$, and the cost per page is a constant c1. During the instance, a write page fault is incurred for every page of shared data modified in the first PPR instance. The constant per page cost is negligible compared to the cost of copying a modified page.

Two types of copying costs may appear on the critical path. The first is for pages of shared data modified by the lead process in the first PPR instance and (among those) pages modified again by the understudy. The second is taking the snapshot of checked data.

The cost in the above formula is the worst case. The copy-on-write mechanism in modern OS may hide most of both costs. Data copying may hurt locality across PPR boundaries, although the locality within is preserved. The footprint of a speculative run is larger than the sequential run as modified data are replicated. However, the read-only data is shared by all processes in main memory and in shared cache (that is physically indexed). As a result, the footprint may be much smaller than running k copies of a program.

It is sufficient to prove the correctness for a single instance of the parallel execution between two PPR instances. An abstract model of an execution is first defined:

memory $V_x$: a set of variables. $V_{all}$ represents all variables in memory.

memory state $S_V^t$: the content of V at time t. For ease of reading, $S_V^t$ (rather than $S_{V_x}^t$) is used to denote the state of $V_x$ at t.

instruction $r_x$: the instructions considered are the markers of the two PPRs, P and Q. $P^b$, $P^e$, $Q^b$, and $Q^e$ (corresponding to $m_P^b$, $m_P^e$, $m_Q^b$ and $m_Q^e$ in Section 2.1). P and Q can be the same region.

execution state $(r_x, S_V^t)$: a point in execution where the current instruction is rx and the state is $S_V^t$.

Execution $(r_1, S_{all}^{t1}) \xrightarrow{p} (r_2, S_{all}^{t2})$: a continuous execution of a process p (which can be either seq, lead or spec) from instruction $r_1$ and state $S_{all}^{t1}$ to the next occurrence of $r_2$ at the state $S_{all}^{t2}$.

Figure 2:
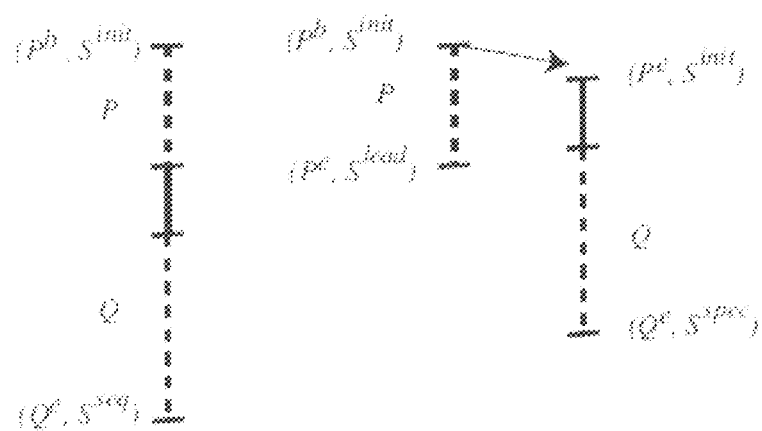
FIG. 2 shows the states of the sequential and parallel executions, according to at least one embodiment of the present invention.

FIG. 2 shows the parallel execution and the states of the lead and the spec processes at different times. If a parallel execution passes the three data protection schemes, all program variables in our abstract model can be partitioned into the following categories:

$V_{wf}$: variables whose first access by spec is a write. wf stands for write first.

$V_{excl\_lead}$: variables accessed only by lead when executing the first PPR instance P.

$V_{excl\_spec}$: variables accessed only by spec.

$V_{chk}$: the remaining variables. chk stands for checked. where, $$V_{chk} = V_{all} - V_{wf} - V_{excl\_lead} - V_{excl\_spec} \quad (3)$$

Examining TABLE 4, $D_{shared}$ contains data that are either accessed by only one process ($V_{excl\_lead}$ and $V_{excl\_spec}$), written before read in spec ($V_{wf}$), read only in both processes or not accessed by either ($V_{chk}$). $D_{private}$ contains data either in $V_{wf}$ or $V_{chk}$. $D_{checked}$ is a subset of $V_{chk}$. In addition, the following two conditions are met upon a successful speculation:

1. the lead process reaches the end of P at $P^e$, and the spec process, after leaving $P^e$, executes the two markers of Q, $Q^b$ and then $Q^e$.

2. the state of $V_{chk}$ is the same at the two ends of P (but it may change in the middle), that is $S_{check}^{init} = S_{check}^{lead}$.

To analyze correctness, the states of the sequential execution are examined, $S^{init}$ at $P^b$ and $S^{seq}$ at $Q^e$ of the sequential process seq, and the states of the parallel execution, $S^{init}$ at $P^b$, $S^{lead}$ at $P^e$ of the lead process and $S^{init}$ at $P^e$ and $S^{spec}$ at $Q^e$ of the spec process. These states are illustrated in FIG. 2.

The concluding state of the parallel execution, $S^{parallel}$ at $Q^e$, is a combination of $S^{lead}$ and $S^{spec}$ after the successful speculation. To be exact, the merging step copies the modified pages from the lead process to the spec process, so $$S^{parallel} = S_{all-excl\_lead}^{spec} + S_{excl\_lead}^{lead} \quad (4)$$

In the following proof, each operation $r_t$ is defined by its inputs and outputs. All inputs occur before any output. The inputs are the read set $R(r_t)$. The outputs include the write set $W(r_t)$ and the next instruction to execute, $r_{t+1}$. It is noted that an operation is an instance of a program instruction. For the simplicity of the presentation, the symbol $r_x$ is used as both the static instruction and its dynamic instances. To distinguish in the text, the former is called an instruction and the latter is called an operation, so that there may be only one instruction $r_x$ but any number of operations $r_x$.

THEOREM 1 (Correctness). If the spec process reaches the end marker of Q, and the protection in Table 2 passes, the speculation is correct, because the sequential execution would also reach $Q^e$ with a state $S^{seq} = S^{parallel}$, assuming that both the sequential and the parallel executions start with the same state, $S^{init}$ at $P^b$.

Proof: Consider the speculative execution, $(P^e, S^{init}) \xrightarrow{spec} (Q^e, S^{spec})$, for the part of the sequential execution, $(P^e, S^{mid}) \xrightarrow{seq} (Q^e, S^{seq})$. The correct sequential execution are noted as $p_e, r_1, r_2, \ldots$ and the speculative execution as $p_e, r'_1, r'_2, \ldots$. The contradiction is proved that every operation $r'_t$ in the speculative execution must be "identical" to $r_t$ in the sequential execution in the sense that $r_t$ and $r'_t$ are the same instruction, they read and write the same variables with the same values, and they move next to the same instruction $r_{t+1}$.

Assume the two sequences are not identical and let $r'_t$ be the first instruction that produces a different value than $r_t$, either by modifying a different variable, the same variable with a different value, or moving next to a different instruction. Since $r_t$ and $r'_t$ are the same instruction, the difference in output must be due to a difference in the input.

Suppose $r_t$ and $r'_t$ read a variable v but see different values v and v'. Since the values cannot differ if the last writes do not exist, let $r_v$ and $r'_v$ be the previous write operations that produce v and v'.

The operation $r'_v$ can happen either in spec before $r'_t$ or in the lead process as the last write to v. It is shown that neither of the two cases is possible. First, if $r'_v$ happens in spec, then it must produce the same output as $r_v$ as per our assumption that $r'_t$ is the first to deviate. Second, $r'_v$ is part of lead and produces a value not visible to spec. Consider the only way v can be accessed. Since ($r'_v$ is the last write so) v is read before being modified in spec, it does not belong to $V_{wf}$ or $V_{excl\_lead}$. Neither is it in $V_{excl\_spec}$ since it is modified in the lead process. The only case left is for v to belong to $V_{chk}$. Since $V_{chk}^{lead} = V_{chk}^{init}$, after the last write the value of v is restored to the beginning state where spec starts and consequently cannot cause $r'_t$ in spec to see a different value as $r_t$ does in the sequential run. Therefore $r_t$ and $r'_t$ t cannot have different inputs and produce different outputs, and the speculative and sequential executions must be identical.

It is now shown that $S^{parallel}$ is correct, that is, $S^{parallel} = S^{seq}$. Since spec reads and writes correct values, $V_{wf}$, $V_{excl\_spec}$, and the accessed part of $V_{chk}$ are correct. $V_{exel\_lead}$ is also correct because of the copying of the their values at the commit time. The remaining part of $V_{chk}$ is not accessed by lead or spec and still holds the same value as $S^{init}$. It follows that the two states $S^{parallel}$ and $S^{seq}$ are identical.

The proof is similar to that of the Fundamental Theorem of Dependence, cited in R. Allen and K. Kennedy, *Optimizing Compilers for Modern Architectures: A Dependence-based Approach*, Morgan Kaufmann Publishers, October 2001. While the proof in the book deals with statement reordering, the proof here deals with region reordering and value-based checking. It rules out two common concerns. First, the intermediate values of checked data never lead to incorrect results in unchecked data. Second, the data protection always ensures the correct control flow by speculation. In BOP, the three checking schemes work together to ensure these strong guarantees.

Strong and weak isolation as discussed above is a basic difference between process-based BOP and thread-based systems that include most hardware and software speculation and transactional memory techniques. The previous section discussed the control aspect. Here the data protection and system implementation is discussed. The comparisons are summarized in TABLE 5.

TABLE 5

| during speculation | strong | weak |
| --- | --- | --- |
| data updates visible to outside | no | yes |
| overall overhead proportional to | data size | data use |
| synchronization on critical path | none | needed |
| hardware memory consistency | independent | dependent |
| support value-based checking | yes | no |
| type of pipelined parallelism | definite | opportunistic |
| detect spec failure early | yes | yes |
| can certify spec success early | yes | yes |

Weak isolation needs concurrent access to both program data and system data. It needs synchronization to eliminate race conditions between parallel threads and between the program and the run-time system. The problem is complicated if the hardware uses weak memory consistency, which does not guarantee correct results without explicit synchronization, if the memory operations are reordered by the compiler and the hardware. In fact, concurrent threads lack a well-defined memory model. A recent loop-level speculation system avoids race conditions and reduces the number of critical sections (to 1) by carefully ordering the system code based on a sequential memory consistency model and adding memory directives to enforce the order under relaxed consistency models. See, for example, M. H. Cintra and D. R. Llanos, Design space exploration of a software speculative parallelization scheme, *IEEE Transactions on Parallel and Distributed Systems*, 16(6):562-576, 2005.

In BOP, parallel processes are logically separated. The correctness check is done sequentially in rolling commits with a complete guarantee as stated in Theorem 1. There is no synchronization overhead on the critical path. The compiler and hardware are free to reorder program operations as they do for a sequential program.

Thread-based systems do not yet support general value-based checking. When data updates are visible, the intermediate value of a checked variable can be seen by a concurrent thread and the effect cannot be easily undone even if the variable resumes the initial value afterwards. For locks, this leads to the ABA problem, where a thread may mistakenly holding different data by the same pointer. A specific solution is developed for a software transactional memory system DSTM. See, for example, M. Herlihy et al., Software transactional memory for dynamic-sized data structures, *Proceedings of PODC*, pages 92-101, Boston, Mass., July 2003. In hardware, a correct value prediction may cause a thread to read at a wrong time and violate the sequential consistency, so value prediction requires careful extra tracking by hardware. No software speculation systems presently known uses value-based checking. With strong isolation in BOP, the intermediate values of checked variables have no effect on other processes, so value-based checking is not only correct but also adds little cost on the critical path.

Value-based checking is different from value-specific dynamic compilation (for example in B. Grant et al., An evaluation of staged run-time optimizations in DyC, *Proceedings of PLDI*, Atlanta, Ga., May 1999.), which finds values that are constant for a region of the code rather than values that are the same at specific points of an execution (and can change arbitrarily between these points). It is different from a silent write, which writes the same value as the previous write to the variable. Our software checking happens once per PPR for a global set of data, and the correctness is independent of the memory consistency model of the hardware.

Most previous techniques monitor data at the granularity of array elements, objects, and cache blocks; BOP uses pages for heap data and padded variables for global data. Paging support is more efficient for monitoring unknown data structures but it takes more time to set up the permissions. It also gives rise to false sharing. The cost of page-based monitoring is proportional to the size of accessed data (for the overhead on the critical path it is the size of modified data) rather than the number of accesses as in threadbased systems, making page-based protection especially suitable for coarse-grain parallelism.

Offline profiling is used to find the possible parallel regions (PPRs). It identifies the high-level phase structure of a program and uses dependence profiling to find the phase with the largest portion of run-time instructions that can be executed in parallel as the PPR. At the same time, program data are classified into shared, checked and private categories based on their behavior in the profiling run.

BOP can also be added by a programmer. The programming interface has three parts. The first is the PPR markers. The second is a list of global and static variables that are write first (privatizable) and checked. The programmer specifies the place where the variables are initialized, and the system treats the data as shared until the initialization.

The third component of the interface is the run-time feedback to the user. When speculation fails, the system outputs the cause of the failure, in particular, the memory page that receives conflicting accesses. In our current implementation, global variables are placed on separate memory pages by the compiler. As a result, the system can output the exact name of the global variable when it causes a conflict. A user can then examine the code and remove the conflict by marking the variable privatizable or moving the dependence out of the parallel region.

Three features of the API are especially useful for working with large, unfamiliar code. First, the user does not write a parallel program and never needs parallel debugging. Second, the user parallelizes a program step by step as hidden dependences are discovered and removed one by one. Finally, the user can parallelize a program for a subset of inputs rather than all inputs. The program can run in parallel even if it has latent dependences.

Compiler support in Gcc 4.0.1 has been implemented. After high-level program optimization passes but before machine code generation, the compiler converts global variables to use dynamic allocation for proper protection. Compiler analysis for local variables was not implemented and instead the system privatizes all stack data. All global and heap data are protected. Each global variable is allocated on separate page(s) to reduce false sharing.

We implemented an instrumentor and a behavior analyzer. The instrumentor, also based on Gcc 4.0.1, collects complete program traces with unique identifiers for instructions, data accesses, and memory and register variables, so the behavior analyzer can track all data dependences and identify PPR.

The BOP run-time is implemented as a statically linked library. Shared memory is used for storing snapshots, access maps, and for copying data at a commit. Most communication is done by signals. No locks are used. Similar systems using two binary instrumentors have been implemented, which do not require program source but offer no easy way of relocating global data, tracking register dependences, or finding the cause of conflicts at the source level.

Figure 3:
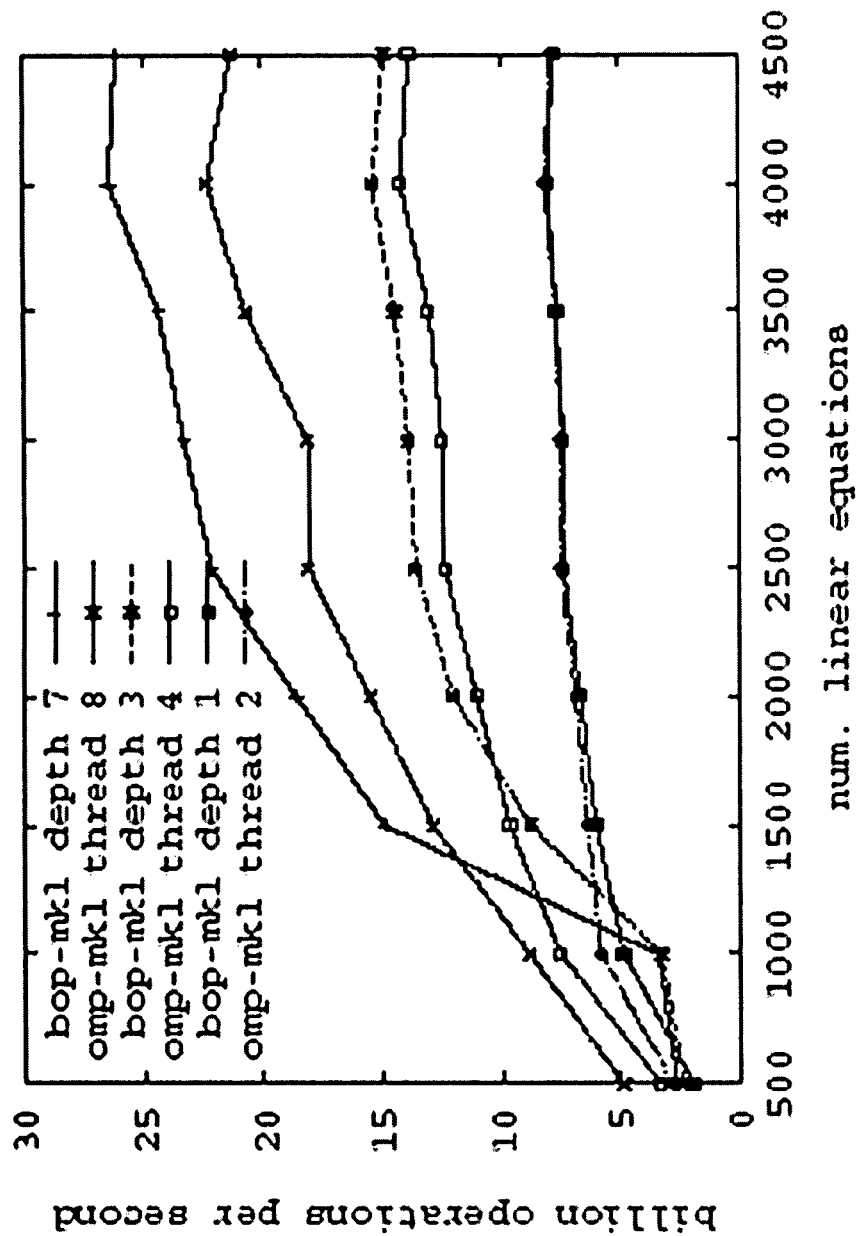
FIG. 3 presents a graph showing the number of operations per second versus the number of linear equations according to different methodologies, according to at least one embodiment of the present invention.

In BOP, the lead process may die long before the program ends, since each successful speculation produces a new lead (see FIG. 3 for an example). Now each parallelized program starts with a timing process that forks the first lead process and waits until the last process is over (when a lead process hits a program exit). Instead of collecting user and system times for all processes, the wall-clock time of the timing process is used, which includes OS overheads in process scheduling. Multiple runs on an unloaded system have also been used.

GNU Gcc 4.0.1 with "–O3" flag for all programs has been used and a newly installed Dell workstation (after installing a 250V power supply) was also employed. It has four dual-core Intel 3.40 GHz Xeon for a total of 8 CPUs. The cpuinfo file shows 16 MB cache. It has 4 GB physical memory.

According to its author in 1985, Xlisp is "a small implementation of lisp with object-oriented programming." The code used was available as part of the SPEC 1995 benchmark suite, which has 25 files and 7616 lines of C code. The main function has two control loops, one for reading expressions from the keyboard and the other for batch processing from a file. By hand the body of the batch loop is marked as a PPR. Through the programming interface described in Section 2.6, we identify 5 likely privatizable variables:

Buf for copying string constants gsprefix for generated name strings xlfsize for counting the string length in a print call xlsample the vestige of a deleted feature called oscheck xltrace intermediate results for debugging and 5 checked variables:

xlstack current stack pointer, restored after an evaluation xlenv current environment, restored after an evaluation xlcontext the setjump buffer for exception handling xlvalue would-be exception value xlplevel parenthesis nesting level, for command prompt and one reduction variable, gccalls, which counts the number of garbage collections. We do not know much about the rest of the 87 global variables (including function pointers) except that they are all monitored by BOP.

The so-parallelized xlisp runs fine until a garbage collection, which changes the heap and always kills the speculation. To solve the problem, we have revised the mark-sweep collector for BOP, which we describe very briefly here. The key idea is to insulate the effect of GC, so it can be done concurrently without causing unnecessary conflicts. Each PPR uses a separate page-aligned region. At the start (after forking but before data protection), a PPR instance runs a marking pass over the entire heap and records all reachable objects in a start list. During the PPR, it allocates new objects inside the region. At a garbage collection, it marks just objects inside the region but it traverses the start list as an additional set of root pointers. It frees an object if it is inside the region. At the end, it performs GC again, so only the pages with live objects are copied at the commit. The code changes include three new global variables and 12 statements, counted by the number of semi-colons, for region-based GC, mostly for collecting and traversing the start list and resetting the MARK flags in its nodes.

The region-based mark-sweep has non-trivial costs at the start and the end of PPR. In the middle it may not be as efficient because it may not collect all garbage (as some nodes in the start list would have become unreachable in the sequential run). These costs depend on the input. In addition, the regions will accumulate longlive data, which leads to more false alerts from false sharing. The evaluation may trigger an exception and an early exit from PPR, so the content of checked variables may not be restored even for parallel expressions. Therefore, one cannot decide a priori whether the chance of parallelism and its likely benefit would outweigh the overhead. However, these are the exact problems that BOP is designed to address with the streamlined critical path and the online sequential-parallel race.

To test the bop-lisp interpreter, we use an input from SPEC95, which in five expressions computes all positions of n queens on an n×n board. When n is 9, the sequential run takes 2.36 seconds using the base collector and 2.25 seconds using the region-based collector (which effectively has a larger heap but still needs over 4028 garbage collections for nine 10K-node regions). Four lines of the lisp program were modified, so the problem is solved by 13 expressions, 9 parallel and 4 sequential. Three speculation depths were tested three times each, and the results are:

TABLE 6

| version | sequential | speculation depth | | |
|---|---|---|---|---|
| | | 1 | 3 | 7 |
| times (sec) | 2.25, 2.27, 2.26 | 1.50, 1.48, 1.47 | .95, .94, .94 | .68, .68, .68 |
| speedup | 1.00 | 1.53 | 2.39 | 3.31 |

The last row shows that the speedup, if the lowest time is picked from three runs, is 1.53 with 2 processors, 2.39 with 4 processors, and 3.31 with 8 processors. Not shown in the table, the failed speculations add 0.02 seconds to the cost.

Gzip takes one or more files as input and compresses them one by one using the Lempel-Ziv coding algorithm (LZ77). Version 1.2.4 was used, available from the SPEC 2000 benchmark suite. Much of the 8616-line C code performs bit-level operations, some through inline assembly. The kernel was based on an earlier implementation on 16-bit machines. The "spec" was not specified so the program behaves as a normal compressor rather than a benchmark program (which artificially lengthens the input by replication).

We make two parallel versions, one by automatic methods, and the other by hand. In the first one, BeginPPR and EndPPR are automatically inserted before reading a file and after the output of the compressed file (for this one we allow file I/O in the PPR), and the variables and allocation sites are classified through profiling analysis.

The second parallel version compresses a single file in parallel. The sequential code compresses one buffer at a time and stores the results until the output buffer is full. We manually placed PPR around the buffer loop and specified the set of likely private variables through the program interface described in above. The program returned correct results but speculation failed because of conflicts caused by two variables, "unsigned short bi buf" and "int bi valid", as detected by the run-time monitoring.

The two variables are used in only three short functions. Inspecting code, it was realized that the compression produced bits, not bytes, and the two variables stored the partial byte of the last buffer. The dependence was hidden below layers of code and among 104 global variables, but the run-time analyzer enabled us to quickly uncover the hidden dependence. We first tried to fill the byte, as the program does for the last byte. However, the result file could not be decompressed. Gzip is most error sensitive. If a single extra or error bit would render the output file meaningless to the decompressor. A second solution is to compress buffers in parallel and concatenate the compressed bits afterwards. This requires tens lines of coding, but it was sequential programming and was done by one of the authors in one day.

Inter-file parallel gzip performs similarly as one may get from invoking multiple gzip programs. The intra-file compression permits single-file compression to use multiple processors. We test bop-gzip on a single 84 MB file (the Gcc4.0.1 tar file) and compares the running times of the unmodified sequential code and the BOP version with three speculation depths. The execution time is stable in sequential runs but varies by as much as 67% in parallel runs, so in the following table we include the result of six consecutive tests of each version and compute the speedup based on the average time.

TABLE 7

| version | sequential | speculation depth | | |
|---|---|---|---|---|
| | | 1 | 3 | 7 |
| times (sec) | 8.46, 8.56, 8.50, 8.51, 8.53, 8.48 | 7.29, 7.71, 7.32, 7.47, 5.70, 7.02 | 5.38, 5.49, 4.16, 5.71, 5.33, 5.56 | 4.80, 4.47, 4.49, 3.10, 2.88, 4.88 |
| avg time | 8.51 | 7.09 | 5.27 | 4.10 |
| avg speedup | 1.00 | 1.20 | 1.61 | 2.08 |

With 2, 4, and 8 processors, the parallel compression gains speedups of 1.20, 1.61, and 2.08. The 8-way gzip is twice as fast and it is slightly faster than data decompression by gunzip, whose time is between 4.40 and 4.73 seconds in 6 runs. The critical path of bop-gzip, when all speculation fails, runs slightly faster than the sequential version because of the effect of prefetching by the speculation.

According to the Spec2K web site, "The parser has a dictionary of about 60000 word forms. It has coverage of a wide variety of syntactic constructions, including many rare and idiomatic ones . . . . It is able to handle unknown vocabulary, and make intelligent guesses from context about the syntactic categories of unknown words." It is not clear in the documentation or the 11,391 lines of its C code whether the parsing of sentences can be done in parallel. In fact, they are not. If a PPR instance parses a command sentence which changes the parsing environment, e.g. turning on or off the echo mode, the next PPR instance cannot be speculatively executed. This is a typical example of dynamic parallelism.

The parallelism analyzer identifies the sentence-parsing loop. We manually strip-mine the loop to create a larger PPR. The data are then classified automatically. During the training run, 16 variables are always written first by the speculation process during training, 117 variables always have the same value at the two ends of a PPR instance, and 35 variables are shared.

The parallel parser was tested using 1022 sentences obtained by replicating SPEC95 train input twice. When each PPR includes the parsing of 10 sentences, the sequential run takes 11.34 second, and the parallel runs show speedup of 1.13, 1.62 and 2.12 with a few failed speculations due to the dynamic parallelism.

TABLE 8

| version | sequential | speculation depth | | |
|---|---|---|---|---|
| | | 1 | 3 | 7 |
| times (sec) | 11.35, 11.37, 11.34 | 10.06, 10.06, 10.07 | 7.03, 7.01, 7.04 | 5.34, 5.35, 5.34 |
| speedup | 1.00 | 1.13 | 1.62 | 2.12 |

The Intel Math Kernel Library 9.0 (MKL) provides highly optimized, processor-specific, and multi-threaded routines specifically for Intel processors. The library includes Linear Algebra Package (LAPACK) routines used for, among other things, solving systems of linear equations. In this experiment we compare the performance of solving eight independent systems of equations using the dgesv routine. MKL exploits thread-level parallelism inside but not across library calls. The number of threads was set using the OMP NUM THREADS environment variable. BOP, on the other hand, can speculatively solve the systems in parallel even when it uses an unparallelized library. We set OMP NUM THREADS to 1 for BOP. Since the program data are protected, BOP guarantees program correctness if speculation succeeds.

The experiment was conducted over the range of 500 to 4500, in increments of 500, equations per system. For each, the number of threads in the MKL-only implementation tested was 1, 2, 4, and 8. For the BOP and MKL implementation, the levels of speculation tested was 0, 1, 3, and 7. Results for the single-threaded MKL run and zero-speculation BOP run are not shown due to limited space. As shown in FIG. 3, bop-mkl depth 1 and omp-mkl thread 2 perform similarly, with the MKL-only implementation achieving at most an 18% increase in operations per second for 1000 equations. For bop-mkl depth 3 and bop-mkl depth 7, the runtime overhead of the BOP system prevents speedups for roughly 1750 and 1300 number of equations, respectively, and below. However, above these ranges the course-grained parallelism provided by BOP is able to outperform the fine-grained, thread-level parallelism of the MKL library. Increases between 15% and 20% are seen for bopmkl depth 7 compared to omp-mkl thread 8 and increases between 7% and 11% are seen for bop-mkl depth 3 compared to omp-mkl thread 4.

The comparison with threaded MKL helps to understand the overhead of processed-based BOP, in particular its relation with the size of parallel tasks and the speculation depth. The results demonstrate the property explained above: the overhead becomes less if the granularity is large or if the speculation depth is high. For 1500 equations, 3 speculation processes perform 10% slower than 4-thread MKL because of the overhead. However, for the same input size, the greater parallelism from 7 speculation processes, more than compensates for the overhead and produces an improvement of 16% over 8-thread MKL. BOP was also tested against another scientific library, the threaded ATLAS, and found similar results, although ATLAS is slower than MKL on the test machine.

Most languages let a user specify the unit of parallel execution explicitly, for example, pcall and future in Multilisp, parallel loop and section in OpenMP, and transaction in transactional memory. Most and require definite parallelism. Transactions are an exception because the parallelism is not guaranteed. Still, all require well-form regions with predictable entries and exits. The annotations are binding because they affect the program correctness. Since PPR regions are not binding and do not have to be well formed, it allows computation partitioning based on the partial information about program behavior, for example, a user reading part of the source code, or a profiling tool examining a few inputs.

For general-purpose imperative programs, the synchronization is either static (e.g. in OpenMP) or dynamic based on the runtime access of the shared data. The access can be specified as programmed (and typed) descriptions as in Jade, (see, for example, M. C. Rinard and M. S. Lam, The design, implementation, and evaluation of Jade, *ACM Transactions on Programming Languages and Systems* (*TOPLAS*), 20(3): 483-545, 1998.) or as simple annotations as in software transactional memory. BOP assumes all data are shared by default and uses profiling analysis, so it needs little or no user specification. In addition, the checked and private data are suggested through non-binding hints, which allow partial and incorrect specifications. The disadvantage is the additional cost of data protection and hint checking, which BOP hides from the critical path.

Loop-level software speculation is pioneered by the lazy privatizing doall (LPD) test. See, for example, L. Rauchwerger and D. Padua, The LRPD test: Speculative run-time parallelization of loops with privatization and reduction parallelization, *Proceedings of PLDI*, La Jolla, Calif., June 1995. LPD has two separate phases: the marking phase executes the loop and records access to shared arrays in a set of shadow arrays, and the analysis phase then checks for dependence between any two iterations. Later techniques speculatively privatize shared arrays (to allow for false dependences) and combine the marking and checking phases (to guarantee progress). Previous systems also address issues of parallel reduction and different strategies of loop scheduling. A weaker type of software speculation is used for disk prefetching, where only the data access of the speculation needs to be protected (through compiler-inserted checks). The prefetching effect has been observed in the tests of gzip.

The BOP system speculatively privatizes the entire address space, so it has a higher overhead and the additional problem of false sharing. While the heavy-weight protection is not warranted at the loop level, it is needed for unpredictable programs and for programmable speculation. A user can enable parallel reduction by coding with PPR regions. Our experience shows that the general protection, the programmable interface, and the value-based checking are critical for cost-effective speculation in large integer applications.

Hardware-based thread-level speculation is among the first to automatically exploit loop- and method-level parallelism in integer code. In most techniques, the states of speculative threads are buffered and checked by monitoring the data accesses in earlier threads either through special hardware additions to a processor, bus snooping, or an extended cache coherence protocol. Since speculative states are buffered in hardware, the size of threads is usually no more than thousands of instructions. A recent study classifies existing loop-level techniques as control, data, or value speculation and shows that the maximal speedup is 12% on average for SPEC2Kint assuming no speculation overhead and unlimited computing resources. The limited potential at the loop level suggests that speculation needs to be applied at larger granularity to fully utilize multi-processor machines.

Transactional memory was originally proposed as a hardware mechanism to support nonblocking synchronization (by extending cache coherence protocols) and several software implementations are built for existing hardware. Transaction semantics, which requires a serializable result, is less restrictive than parallelization, which requires observational equivalence or the same result as the original sequential execution. Like transactions, PPR regions do not guarantee parallelism. Unlike transactions, PPR regions do not affect the meaning of a program. Since incorrectly inserted regions do not break a program, PPR is easier to use for a user or a tool to parallelize an unfamiliar program.

At the implementation level, serializibility checking requires the monitoring of both data reads and writes, so it is more costly than the run-time dependence checking. The addition flexibility is useful for supporting parallel reduction, but it is not strictly necessary for parallelization as it is for concurrency problems such as on-line ticket booking. Current transactional memory systems monitor data accesses rather than values for conflict detection.

For large programs using complex data, per-access monitoring causes slow-downs often in integer multiples, as reported for data breakpoints and on-the-fly data race detection, even after removing as many checks as possible by advanced compiler analysis. It is difficult for dynamic speculation to afford such slowdown and be practical. BOP uses page-based monitoring for shared data to trade precision for efficiency (without compromising correctness). Unlike previous methods whose overhead is proportional to the length of execution, the cost on the critical path of BOP is proportional to the size of shared, private, or checked data.

With programmable dynamic PPR regions, strong isolation during speculation, minimal critical path, and value-based correctness checking, BOP enables parallelization based on the partial information of program behavior. We have built a prototype implementation including a parallelism analyzer, a compiler, and a run-time system and have parallelized a set of non-trivial applications, most of them have not been parallelized (or known parallelizable) before this work. On a 8-CPU machine, their performance is improved by integer factors.

BOP is best suited for parallelizing large, existing code with a minimal effort. Known dependences, such as error handling and garbage collection, can stay in code as long as they happen rarely. Parallelization can be done in incremental steps by removing dependences one by one as detected by the run-time feedbacks. At no point does a programmer need parallel debugging.

While a preferred embodiment of the invention has been set forth above, those skilled in the art who have reviewed the present disclosure will readily appreciate that other embodiments can be realized within the scope of the invention. For example, numerical values are illustrative rather than limiting, as are specific techniques for attenuation and the like. Therefore, the present invention should be construed as limited only by the appended claims.

What is claimed is:

1. A method of dynamic parallelization for programs in systems having at least two processors, the method comprising the steps of:
    examining computer code of a program to be performed by the system;
    determining a largest possible parallel region in the computer code using profiling to identify a high-level phase structure of the program and using dependence profiling to find a phase with a largest portion of run-time instructions that can be executed in parallel, wherein the profiling and dependence profiling include examining both the computer code and at least one training execution of the computer code;
    classifying data to be used by the program based on a usage pattern obtained during the profiling; and
    initiating multiple, concurrent processes to perform the program, the multiple concurrent processes comprising a lead process executing the program non-speculatively, an understudy process executing the program non-speculatively and providing correct processing when a speculation process fails, and each speculation process executing at least a portion of the program speculatively in parallel with the lead and understudy processes and providing faster processing than the lead and understudy processes when the speculation process does not fail;
    wherein the multiple, concurrent processes ensure a baseline performance that is at least as efficient as a sequential performance of the computer code.

2. A method of dynamic parallelization for programs according to claim 1, wherein the step of classifying data comprises classifying data as either shared data, checked data or private data.

3. A method of dynamic parallelization for programs according to claim 1, wherein the method improves performance of the computer code by integer factors when compared to the sequential performance of the computer code.

4. A method of dynamic parallelization for programs according to claim 1, wherein the computer code was written to be run on systems having a single processor.

5. A method of dynamic parallelization for programs according to claim 1, wherein the examining, determining and classifying steps are performed through examination of a portion of the total computer code.

6. A method of dynamic parallelization for programs according to claim 1, wherein the method is performed in a step-by-step fashion to allow a programmer to discover hidden dependencies preventing successful parallel execution of multiple, concurrent processes.

7. A method of dynamic parallelization for programs according to claim 1, further comprising:
    displaying to a user markers of programmable hints of possible parallel regions of computer code; and
    after performing the program, displaying to the user indications of conflicting memory access.

8. A method of dynamic parallelization for programs according to claim 1, wherein the classifying step further comprises performing value-based correctness checking to permit parallel execution in the presence of true dependencies.

9. A computer program product, embodied on a non-transitory computer-readable medium, having instructions to perform steps comprising:
    examining computer code of a program to be performed by a system having at least two processors;
    determining a largest possible parallel region in the computer code using profiling to identify a high-level phase structure of the program and using dependence profiling to find a phase with a largest portion of run-time instructions that can be executed in parallel, wherein the profiling and dependence profiling include examining both the computer code and at least one training execution of the computer code;
    classifying data to be used by the program based on a usage pattern obtained during the profiling; and
    initiating multiple, concurrent processes to perform the program, the multiple concurrent processes comprising a lead process executing the program non-speculatively, an understudy process executing the program non-speculatively and providing correct processing when a speculation process fails, and each speculation process executing at least a portion of the program speculatively in parallel with the lead and understudy processes and providing faster processing than the lead and understudy processes when the speculation process does not fail;
    wherein the multiple, concurrent processes ensure a baseline performance that is at least as efficient as a sequential performance of the computer code.

10. A computer program product according to claim 9, wherein the instructions for classifying data comprises instructions for classifying data as either shared data, checked data or private data.

11. A computer program product according to claim 9, wherein the instructions improve performance of the computer code by integer factors when compared to the sequential performance of the computer code.

12. A computer program product according to claim 9, wherein the computer code was written to be run on systems having a single processor.

13. A computer program product according to claim 9, wherein the instructions for examining, determining and classifying steps are performed through examination of a portion of the total computer code.

14. A computer program product according to claim 9, wherein the instructions cause the steps to be performed in a step-by-step fashion to allow a programmer to discover hidden dependencies preventing successful parallel execution from the multiple, concurrent processes.

15. A computer program product according to claim 9, further comprising instructions to perform steps comprising:
 displaying to a user markers of programmable hints of possible parallel regions of computer code; and
 after performing the program, displaying to the user indications of conflicting memory access.

16. A computer program product according to claim 9, wherein instructions to perform the classifying step further comprise instructions to perform value-based correctness checking to permit parallel execution in the presence of true dependencies.

17. A compiling system comprising at least one processor, memory, and computer program code for performing dynamic parallelization for programs in computing systems having at least two processors, comprising:
 means for examining computer code of a program to be performed by a computing system having at least two processors;
 means for determining a largest possible parallel region in the computer code using profiling to identify a high-level phase structure of the program and using dependence profiling to find a phase with a largest portion of run-time instructions that can be executed in parallel, wherein the profiling and dependence profiling include examining both the computer code and at least one training execution of the computer code;
 means for classifying data to be used by the program based on a usage pattern obtained during the profiling; and
 means for initiating multiple, concurrent processes to perform the program, the multiple concurrent processes comprising a lead process executing the program non-speculatively, an understudy process executing the program non-speculatively and providing correct processing when a speculation process fails, and each speculation process executing at least a portion of the program speculatively in parallel with the lead and understudy processes and providing faster processing than the lead and understudy processes when the speculation process does not fail;
 wherein the multiple, concurrent processes ensure a baseline performance that is at least as efficient as a sequential performance of the computer code.

18. A compiling system according to claim 17, wherein the means for classifying data comprises means for classifying data as either shared data, checked data or private data.

19. A compiling system according to claim 17, wherein the compiling system is configured to improve performance of the computer code by integer factors when compared to the sequential performance of the computer code.

20. A compiling system according to claim 17, wherein the computer code was written to be run on systems having a single processor.

21. A compiling system according to claim 17, wherein the means for examining, the means for determining and the means for classifying are configured to perform their functions through examination of a portion of the total computer code.

22. A compiling system according to claim 17, wherein the compiling system is configured to perform such that a programmer running the compiling system can discover hidden dependencies preventing the successful parallel execution from multiple, concurrent processes.

23. A compiling system according to claim 17, further comprising:
 means for displaying to a user markers of programmable hints of possible parallel regions of computer code; and
 means for after performing the program, displaying to the user indications of conflicting memory access.

24. A compiling system according to claim 17, further comprising:
 means to perform value-based correctness checking to permit parallel execution in the presence of true dependencies.

* * * * *